(No Model.)
N. ROGGY.
CULTIVATOR.
No. 378,463. Patented Feb. 28, 1888.
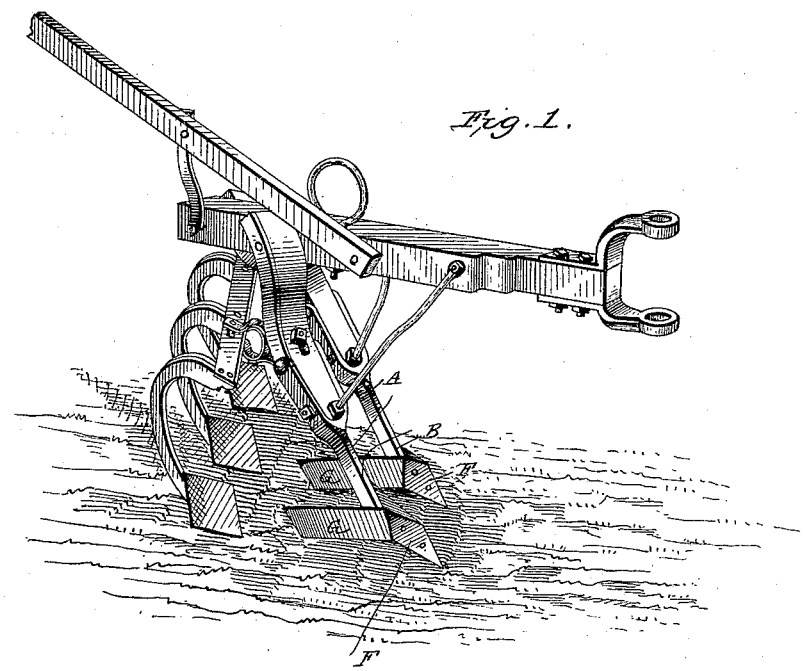
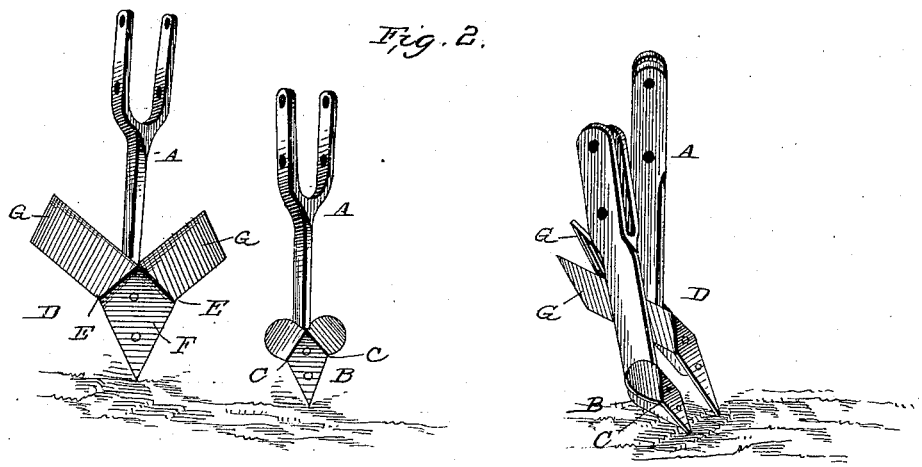
WITNESSES.
Edwin L. Yewell.
Chas. Helm.
INVENTOR.
Nicholas Roggy.
By Manahan & Ward.
Attorneys.

UNITED STATES PATENT OFFICE.

NICHOLAS ROGGY, OF WALNUT, ILLINOIS.

CULTIVATOR.

SPECIFICATION forming part of Letters Patent No. 378,463, dated February 28, 1888.

Application filed December 1, 1887. Serial No. 256,701. (No model.)

*To all whom it may concern:*

Be it known that I, NICHOLAS ROGGY, a citizen of the United States, residing at Walnut, in the county of Bureau and State of Illinois, have invented certain new and useful Improvements in Cultivators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to cultivators; and it consists in certain practical and valuable improvements which I have made upon the implement for which I have received Letters Patent of the United States No. 350,506 on October 12, 1886, and like Letters Patent No. 366,258, dated July 12, 1887, and as the implement is fully shown and described in the patents referred to I do not deem it necessary to describe any of the parts thereof other than those involved in or immediately connected with the subject-matter of my present invention. The implement, as shown in said former patents, operated very well in ordinary ground; but in extremely hard ground there was difficulty in keeping the leading knives or flat shovels a sufficient depth in the ground; also, by reason of the small space under the leading knives, the supporting-seat thereof had to be made very wide in order to afford sufficient strength, and this involved a corresponding width of the knives themselves, which increased the friction of the earth thereon, and the pressure of the earth being too slight at the discharging edge, there was difficulty in having the knives clean themselves, or scour at and near their discharging or upper edges. Again, by reason of the entire side of each front knife being quite wide and presenting a somewhat oblique surface laterally, there was an unnecessary amount of labor involved in shifting the machine laterally during its forward progress—a movement which is quite necessary where the rows of corn are crooked and where it is desired to reach particular patches of weeds.

In my present invention, while apparently very simple, I have obviated these difficulties, and from a practical test thereof I am satisfied that the improvements herein claimed are important, practicable, and valuable.

These improvements consist, broadly, in forming in the front knives two upward angles diverging from the front of the lower end of the supporting stem or standard, by means of which the front portion of said knives has a downward draw, while the rear portion has somewhat of a counteracting effect, and the entire device combines in one piece somewhat the function of an ordinary shovel and a substantially horizontal running knife, the whole, however, being adapted to run beneath the surface of the ground.

As will be seen by reference to the patents referred to, the implement as a whole consists of two counterparts, each of which is operated between different rows of corn and independently of the other, the implement belonging to the class of straddle-row cultivators, and I do not deem it necessary to show or describe more than one of said parts.

In the drawings, Figure 1 is a side elevation, in perspective, of one of said counterparts. Fig. 2 exhibits details of the front and side of the knife aforesaid and of its supporting-stem.

As the parts shown in the implement other than said knife and stem are fully shown and described in said former patents, and in their present construction have no other or different function, no further description thereof will be needed herein, and I will therefore limit the present description to the improvements upon said former construction claimed in this application.

A is a stem or knife seat, which, as in the former construction, is bifurcated at its upper end, and attached to the lower end of an ordinary standard by being placed astride of such standard and held in place by transverse horizontal bolts. The lower portion of the stem A is provided with a foot, B, in the sides of which there are formed the two upwardly-extending bends or angles C C, which diverge from the front edge of the stem A at substantially a right angle to each other.

D is the knife referred to, in the upper surface of which are formed upward bends or angles E E, which have their convergence at the front edge of the stem A, and diverge there-from outwardly and forward at substantially right angles with each other, in conformity with the similar formation aforesaid of the foot B. The knife D is seated on the upper surface of the foot B by means of the usual vertical bolts countersunk at their upper ends in the upper surface of said knives, so as to offer no obstruction to the passage of earth.

As a result of the aforesaid angular formation, the knife D consists of the front depressed portion, F, and the lateral and rear portions, G, slightly depressed from the angle E toward the rear. The front or depressed portion, F, is bent downward from the prolongation of the plane of the parts G about thirty-two degrees, and as the upward angle of the rear portion, G, as compared with the surface of the ground, is very slight, the front portion, F, is deflected a greater distance below the plane of the movement of the implement than the rear portions, G, are raised above it; but equipoise is attained, notwithstanding the fact that the front portion, F, meets with more resistance, in that it encounters the former portion of the ground by the greater proportion of engaging surface of the portions G G.

The advantages of the present conformation are several: First, by the depression F aforesaid, the knife D is given a slight draw at its forward end, and the point thereof is beneath the grass and weeds, roots, and rubbish usually intermixed with the surface of the earth, and such point is therefore not likely to become clogged or impeded. Again, by the central recess of the knife D, afforded by the angles E E therein, an underlying cavity or recess is afforded for the foot B, and the latter can be made of greater vertical thickness than before, and thereby the former necessary width of said knife largely diminished, which not only diminishes the friction thereon, but makes the knife more easily moved laterally in the use of the implement. This latter advantage is further increased by the fact that the portion F is moved laterally edgewise, and therefore meets less resistance from the earth in such lateral movement than in the former construction, where the entire side of the knife in such movement had to be forced through the earth.

The present reduction of width of the sides of the knife D is advantageous, also, in securing the scouring or cleaning of the latter. The reduction afforded by this change of construction makes a difference of fifteen pounds in the weight of a full-sized implement.

In the former construction, also, the cutting-edge of the knife D was in one plane from its point to its rear, while in the present construction there is produced what is termed a "draw cut" throughout the entire engaging edge of said knife, the front portion, F, having a draw downward and the rear portion, G, a draw upward, which divests said knife of its former dragging movement.

The knife D can be cut from a steel plate and forged into its present shape by one operation of a stamp or die and the cutting-edges thereof afterward drawn out to a suitable thinness; or the same can be formed in two parts, leaving their junction or engaging edges in a line directly in front of the stem A.

The implement was designed from the beginning for a surface-cultivator and to avoid the deeper cut of the ordinary shovel-plow; and the depression F being centrally located and comparatively narrow, it does not produce the objectionable results experienced in running the ordinary shovel close to the hill of corn; and, as before observed, the slight upward inclination of the rear portion, G, of the knife D counteracts, in a measure, the downward draw of the point F, and thereby divests the latter of the digging action of the ordinary shovel.

What I claim as my invention, and desire to secure by Letters Patent of the United States, is—

1. In a cultivator, the stem A, provided with the foot B and upwardly-formed divergent angles C C therein, substantially as shown, and for the purpose described.

2. The knife D, provided with the divergent upward angles E E therein, and the depressed front portion, F, and slightly-raised rear portion, G, substantially as shown, and for the purpose described.

3. In a cultivator, the combination of the stem A, provided with the supporting-foot B, with divergent upward angles C C therein, and the knife D, provided with the upward divergent angles E E, and the downwardly-depressed portion F and rearwardly-depressed portion G, substantially as shown, and for the purpose described.

In testimony whereof I affix my signature in presence of two witnesses.

NICHOLAS ROGGY.

Witnesses:
WILLIAM ELLMAKER,
JOHN G. MANAHAN.